United States Patent
Grissom et al.

(10) Patent No.: US 8,490,395 B2
(45) Date of Patent: Jul. 23, 2013

(54) TURBINE REGULATING VALVE SYSTEM

(75) Inventors: Thomas A. Grissom, Dexter, MI (US); Matthew B. Delavan, Rochester, MI (US)

(73) Assignee: BorgWarner Inc., Auburn Hills, MI (US)

( * ) Notice: Subject to any disclaimer, the term of this patent is extended or adjusted under 35 U.S.C. 154(b) by 290 days.

(21) Appl. No.: 12/928,849

(22) Filed: Dec. 21, 2010

(65) Prior Publication Data

US 2011/0094222 A1 Apr. 28, 2011

Related U.S. Application Data

(63) Continuation of application No. 11/293,002, filed on Dec. 2, 2005, now abandoned.

(60) Provisional application No. 60/635,769, filed on Dec. 14, 2004.

(51) Int. Cl.
| F02B 33/44 | (2006.01) |
| F02B 33/00 | (2006.01) |
| F02B 37/00 | (2006.01) |
| F02B 37/16 | (2006.01) |
| F02B 37/18 | (2006.01) |
| F02D 23/00 | (2006.01) |

(52) U.S. Cl.
USPC ............................... 60/612; 60/602; 123/562

(58) Field of Classification Search
USPC .................................... 60/612, 602; 123/562
IPC ..................... F02B 37/007, 37/00, 37/16, 37/18, F02B 37/22, 37/013
See application file for complete search history.

(56) References Cited

U.S. PATENT DOCUMENTS

| 4,294,073 A | 10/1981 | Neff |
| 5,063,744 A | 11/1991 | Ishiyama et al. |
| 5,069,194 A | 12/1991 | Deutschmann et al. |
| 5,142,866 A | 9/1992 | Yanagihara et al. |
| 5,199,261 A | 4/1993 | Baker |
| 5,560,207 A | 10/1996 | Ramsden et al. |
| 5,697,217 A | 12/1997 | Ramsden et al. |
| 5,899,070 A | 5/1999 | Droessler et al. |
| 5,974,801 A | 11/1999 | Houtz |
| 6,079,211 A | 6/2000 | Woollenweber et al. |
| 6,089,019 A | 7/2000 | Roby et al. |
| 6,263,672 B1 | 7/2001 | Roby et al. |
| 6,279,320 B1 | 8/2001 | Mailänder |
| 6,282,899 B1 | 9/2001 | Gladden |
| 6,286,312 B1 | 9/2001 | Bertilsson |
| 6,311,493 B1 | 11/2001 | Kurihara et al. |
| 6,324,848 B1 | 12/2001 | Gladden et al. |

(Continued)

FOREIGN PATENT DOCUMENTS

| DE | 196 03 591 C1 | 3/1997 |
| DE | 195 14 572 C2 | 4/1997 |

(Continued)

*Primary Examiner* — Thai Ba Trieu
(74) *Attorney, Agent, or Firm* — Warn Partners, P.C.

(57) ABSTRACT

A regulated two-stage turbocharger system is provided. The turbocharger system includes high-pressure and low-pressure turbochargers in communication with one another. The turbocharger system includes a valve system having valves that are independently controllable so as to selectively control the gas flow into the turbine portions of the high-pressure turbocharger and the low-pressure turbocharger. The valves are asymmetric with differing perimeters, diameters, and sizes with respect to one another.

1 Claim, 6 Drawing Sheets

U.S. PATENT DOCUMENTS

| | | | |
|---|---|---|---|
| 6,415,846 B1 | 7/2002 | O'Hara | |
| 6,543,228 B2 | 4/2003 | Deacon | |
| 6,694,736 B2 | 2/2004 | Pflüger | |
| 6,709,160 B1 | 3/2004 | Ward et al. | |
| 6,715,288 B1 | 4/2004 | Engels et al. | |
| 6,802,184 B2 | 10/2004 | Huter et al. | |
| 7,600,380 B2 * | 10/2009 | Grissom et al. | 60/612 |
| 8,028,525 B2 * | 10/2011 | An et al. | 60/612 |
| 8,307,649 B2 * | 11/2012 | Axelsson et al. | 60/612 |
| 2003/0159443 A1 | 8/2003 | Huter | |
| 2003/0206798 A1 | 11/2003 | Allmang et al. | |
| 2004/0037716 A1 | 2/2004 | Jaisle | |
| 2004/0062645 A1 | 4/2004 | Decker et al. | |
| 2004/0088976 A1 | 5/2004 | Jaisle | |
| 2004/0134193 A1 | 7/2004 | Klingel | |
| 2004/0194447 A1 | 10/2004 | Roby | |
| 2004/0197212 A1 | 10/2004 | Roby | |
| 2005/0086936 A1 | 4/2005 | Bucknell et al. | |
| 2009/0031722 A1 * | 2/2009 | An et al. | 60/612 |
| 2011/0185724 A1 * | 8/2011 | Barth et al. | 60/612 |

FOREIGN PATENT DOCUMENTS

| | | |
|---|---|---|
| DE | 197 09 879 A1 | 9/1998 |
| DE | 297 23 421 U1 | 11/1998 |
| DE | 198 22 874 A1 | 11/1999 |
| DE | 198 51 028 A1 | 5/2000 |
| DE | 199 61 610 A1 | 4/2001 |
| DE | 199 60 152 A1 | 6/2001 |
| DE | 100 14 755 A1 | 10/2001 |
| DE | 100 15 291 A1 | 10/2001 |
| DE | 695 20 594 T2 | 10/2001 |
| DE | 100 19 774 A1 | 11/2001 |
| DE | 100 60 690 A1 | 6/2002 |
| DE | 101 44 663 A1 | 4/2003 |
| DE | 102 09 002 A1 | 9/2003 |
| DE | 103 09 808 A1 | 10/2003 |
| DE | 103 12 990 A1 | 11/2003 |
| DE | 102 22 919 A1 | 12/2003 |
| DE | 102 30 934 A1 | 1/2004 |
| DE | 102 35 531 A1 | 2/2004 |
| DE | 103 19 594 A1 | 11/2004 |
| EP | 0 537 179 B1 | 12/1996 |
| EP | 1 008 735 A2 | 6/2000 |
| EP | 0 718 481 B1 | 10/2000 |
| EP | 0 864 737 B1 | 1/2001 |
| EP | 0 793 775 B1 | 4/2001 |
| EP | 1 101 917 | 5/2001 |
| EP | 1 154 133 A2 | 11/2001 |
| EP | 0 856 097 B1 | 4/2002 |
| EP | 1 215 378 A2 | 6/2002 |
| EP | 1 256 703 A2 | 11/2002 |
| EP | 1 136 676 A3 | 12/2002 |
| EP | 1 275 832 A2 | 1/2003 |
| EP | 1 288 463 A1 | 3/2003 |
| EP | 0 972 918 A3 | 5/2003 |
| EP | 1 291 505 A3 | 11/2003 |
| EP | 1 382 816 A2 | 1/2004 |
| EP | 1 387 058 A2 | 2/2004 |
| EP | 1 101 917 B1 | 3/2004 |
| EP | 1 396 619 A1 | 3/2004 |
| EP | 1 400 667 A2 | 3/2004 |
| FR | 2 744 491 A1 | 8/1997 |
| FR | 2 817 909 A1 | 6/2002 |
| FR | 2 844 549 A1 | 3/2004 |
| GB | 2 294 729 A | 5/1996 |
| GB | 2 386 924 A | 10/2003 |
| JP | 2000 08878 A | 1/2000 |
| JP | 2001 140653 | 5/2001 |
| JP | 2004 28104 A | 1/2004 |
| WO | WO 91/18190 A1 | 11/1991 |
| WO | WO 96/18030 | 6/1996 |
| WO | WO 00/34634 | 6/2000 |
| WO | WO 01/07764 A1 | 2/2001 |
| WO | WO 01/09495 A1 | 2/2001 |
| WO | WO 01/44635 A1 | 6/2001 |
| WO | WO 01/81744 A1 | 11/2001 |

* cited by examiner

TURBINE REGULATING VALVE SYSTEM

CROSS-REFERENCE TO RELATED APPLICATION

This application is a continuation of U.S. patent application Ser. No. 11/293,002, filed Dec. 2, 2005, which claims priority to U.S. Provisional Patent Application No. 60/635,769, filed Dec. 14, 2004. The disclosures of the above applications are incorporated herein by reference.

FIELD OF THE INVENTION

The present invention relates generally to turbochargers for use in automotive applications, and more specifically to control systems for use in regulated two-stage and sequential turbochargers.

BACKGROUND OF THE INVENTION

Turbochargers are generally well known in the art. Basically, a turbocharger is a centrifugal air pump that is driven by the engine's exhaust gas. The turbocharger forces an additional amount of air or air-fuel mixture into the engine, which aids in the increase of combustion pressure and engine power. This allows a relatively smaller engine to deliver acceptable fuel economy during normal driving conditions, and to have the increased power characteristics of a larger engine when needed. Turbochargers have been incorporated into both gasoline and diesel engines, for both commercial and passenger vehicle applications.

Examples of turbocharger technology can be found with reference to commonly assigned U.S. Pat. No. 6,089,019 to Roby; U.S. Pat. No. 6,263,672 to Roby et al.; U.S. Pat. No. 6,415,846 to O'Hara; U.S. Pat. No. 6,543,228 to Deacon; U.S. Pat. No. 6,694,736 to Pfluger; U.S. Pat. No. 6,709,160 to Ward et al.; U.S. Pat. No. 6,715,288 to Engels et al.; U.S. Pat. No. 6,802,184 to Huter et al.; and U.S. Patent Application Publication Nos. 2003/0206798 to Allmang et al.; 2004/0037716 to Jaisle; 2004/0062645 to Decker et al.; 2004/0088976 to Jaisle; 2004/0134193 to Klingel; 2004/0194447 to Roby; and 2004/0197212 to Roby, the entire specifications of all of which are expressly incorporated herein by reference.

A recent development in turbocharger technology has been regulated two-stage or sequential turbochargers, in which two relatively smaller turbocharger units are used instead of a single relatively large conventional turbocharger. These regulated two-stage turbocharger systems typically employ a relatively smaller, high-pressure turbocharger unit in series with a relatively larger, low-pressure turbocharger unit.

Unfortunately, conventional regulated two-stage turbochargers still exhibit unsatisfactory characteristics, especially during the overlapping transition period when the turbo speed of the smaller high-pressure turbocharger unit rapidly decreases and the turbo speed of the larger low-pressure turbocharger unit rapidly increases. This phenomenon is believed to be a momentary loss of torque that occurs before the low-pressure turbocharger unit has reached its particular requisite turbo speed. This "drop" in torque during the transition period is quite noticeable and is objectionable to many drivers, especially those driving expensive, high-performance luxury models.

Accordingly, there exists a need for new and improved regulated two-stage turbocharger systems that produce a relatively smooth and unnoticeable transition period between the operation of the high pressure and low pressure turbocharger units.

SUMMARY OF THE INVENTION

In accordance with the general teachings of the present invention, new and improved turbocharger systems are provided.

Specifically, the present invention provides a flow regulating valve for use between turbine stages in a series/sequential turbocharger system, with modulation of the stage loading that is believed to be critical to maintaining desired engine torque characteristics and transient response.

More specifically, the present invention employs two valve members. In accordance with one aspect of the present invention, the two valve members are of differing area and/or size (e.g., perimeter, diameter, port diameter, and/or the like) with respect to one another. In accordance with another aspect of the present invention, the two valve members (either being equally sized or of differing size and/or area) are operable to be opened (i.e., actuated) independently of one another.

By way of a non-limiting example, by using two valves of different port diameters, the smaller diameter port valve can be opened first, reducing the flow upon initial valve opening compared to two valves opening in parallel or two valves of equal port diameter opening at the same time. By way of a non-limiting example, when the first port flow reaches a substantially linear increase with a change in opening angle, the second valve begins to open, allowing better flow modulation with equal maximum flow capacity. Without being bound to a particular theory of the operation of the present invention, it is believed that maximum flow capacity and modulation of the flow are optimized by proper selection of the port diameters for total flow area with greatest differential in port area.

In accordance with a first embodiment of the present invention, a turbocharger system is provided, comprising: (1) a high-pressure turbocharger unit; (2) a low-pressure turbocharger unit operably associated with the high-pressure turbocharger unit; and (3) a valve system operably associated with either of the high-pressure and low-pressure turbocharger units, wherein the valve system includes at least two valve members operable to selectively meter a gas flow to either of the high-pressure or low-pressure turbocharger units.

In accordance with a second embodiment of the present invention, a turbocharger system is provided, comprising: (1) a high-pressure turbocharger unit having a turbine portion; (2) a low-pressure turbocharger unit having a turbine portion, wherein the low-pressure turbocharger unit is operably associated with the high-pressure turbocharger unit; and (3) a valve system operably associated with either of the turbine portions of the high-pressure and low-pressure turbocharger units, wherein the valve system includes at least two valve members operable to selectively meter a gas flow to either of the turbine portions of the high-pressure or low-pressure turbocharger units.

In accordance with a third embodiment of the present invention, a turbocharger system is provided, comprising: (1) a high-pressure turbocharger unit having a turbine portion; (2) a low-pressure turbocharger unit having a turbine portion, wherein the low-pressure turbocharger unit is operably associated with the high-pressure turbocharger unit; and (3) a valve system operably associated with either of the turbine portions of the high-pressure and low-pressure turbocharger units, wherein the valve system includes at least two valve members operable to selectively meter a gas flow to either of the turbine portions of the high-pressure or low-pressure turbocharger units, wherein the valve members are operable to be independently or sequentially actuated by the valve system.

In accordance with a fourth embodiment of the present invention, a turbocharger system is provided, comprising: (1) a high-pressure turbocharger unit; (2) a low-pressure turbocharger unit operably associated with the high-pressure turbocharger unit; and (3) a valve system operably associated with either of the high-pressure and low-pressure turbocharger units, wherein the valve system includes at least two valve members operable to selectively meter a gas flow to either of the high-pressure or low-pressure turbocharger units, wherein the valve members are asymmetric with respect to one another.

In accordance with a fifth embodiment of the present invention, a turbocharger system is provided, comprising: (1) a high-pressure turbocharger unit having a turbine portion; (2) a low-pressure turbocharger unit having a turbine portion, wherein the low-pressure turbocharger unit is operably associated with the high-pressure turbocharger unit; and (3) a valve system operably associated with either of the turbine portions of the high-pressure and low-pressure turbocharger units, wherein the valve system includes at least two valve members operable to selectively meter a gas flow to either of the turbine portions of the high-pressure or low-pressure turbocharger units, wherein the valve members are asymmetric with respect to one another.

In accordance with a sixth embodiment of the present invention, a turbocharger system is provided, comprising: (1) a high-pressure turbocharger unit having a turbine portion; (2) a low-pressure turbocharger unit having a turbine portion, wherein the low-pressure turbocharger unit is operably associated with the high-pressure turbocharger unit; and (3) a valve system operably associated with either of the turbine portions of the high-pressure and low-pressure turbocharger units, wherein the valve system includes at least two valve members operable to selectively meter a gas flow to either of the turbine portions of the high-pressure or low-pressure turbocharger units, wherein the valve members are operable to be independently or sequentially actuated by the valve system, wherein the valve members are asymmetric with respect to one another.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE INVENTION

The following description of the embodiment(s) of the present invention is merely exemplary in nature and is in no way intended to limit the invention, its application, or uses.

With respect to the use of "fluid," as that term is used herein, it is meant to include any gaseous material including but not limited to air, exhaust gas, and/or the like.

With respect to the use of "fluid communication," as that phrase is used herein, it is meant to include any structure that permits one component to receive and/or introduce a fluid to or into a second component including but not limited to pipes, conduits, tubes, hoses, and/or the like, those terms being used interchangeably herein.

With respect to the use of "gas flow," as that phrase is used herein, it is meant to include any gas flow or stream including but not limited to an air flow, an exhaust gas flow, and/or the like.

Figure 1A:
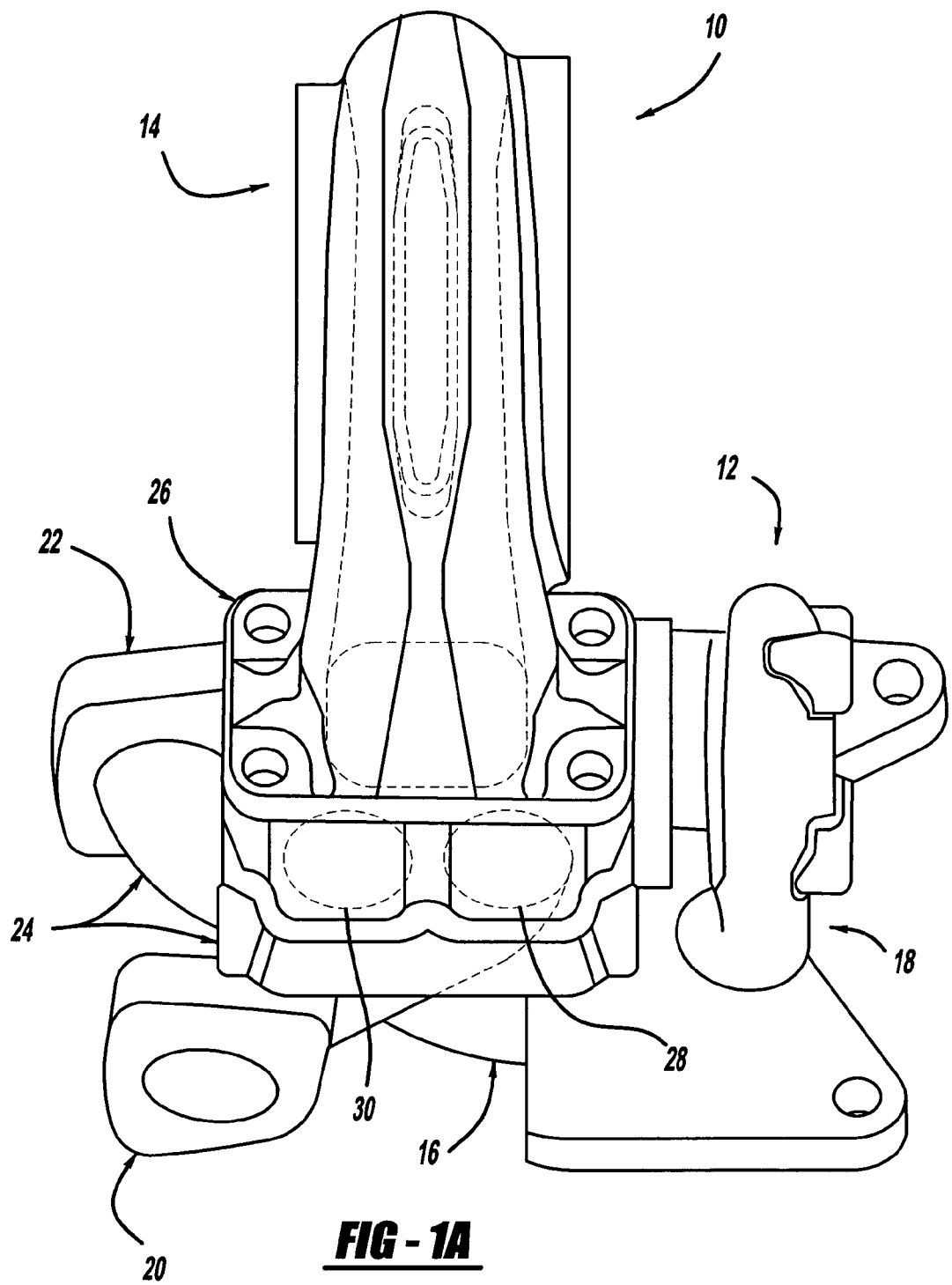
FIG. 1A is a perspective view illustrating a regulated two-stage turbocharger system, in accordance with the general teachings of the present invention.
Figure 1B:
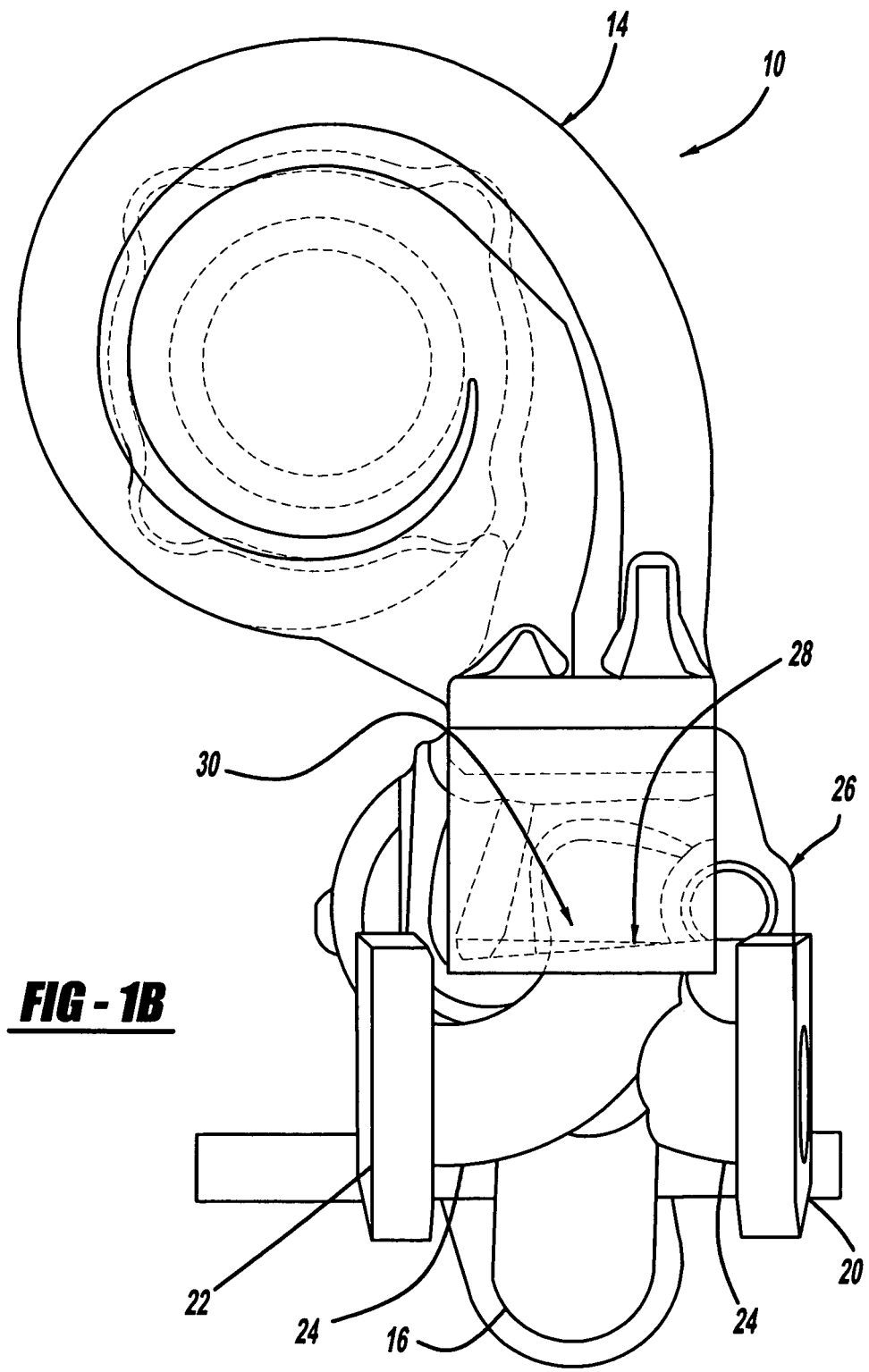
FIG. 1B is a side elevational view of the regulated two-stage turbocharger system depicted in FIG. 1A, in accordance with the general teachings of the present invention.
Figure 1C:
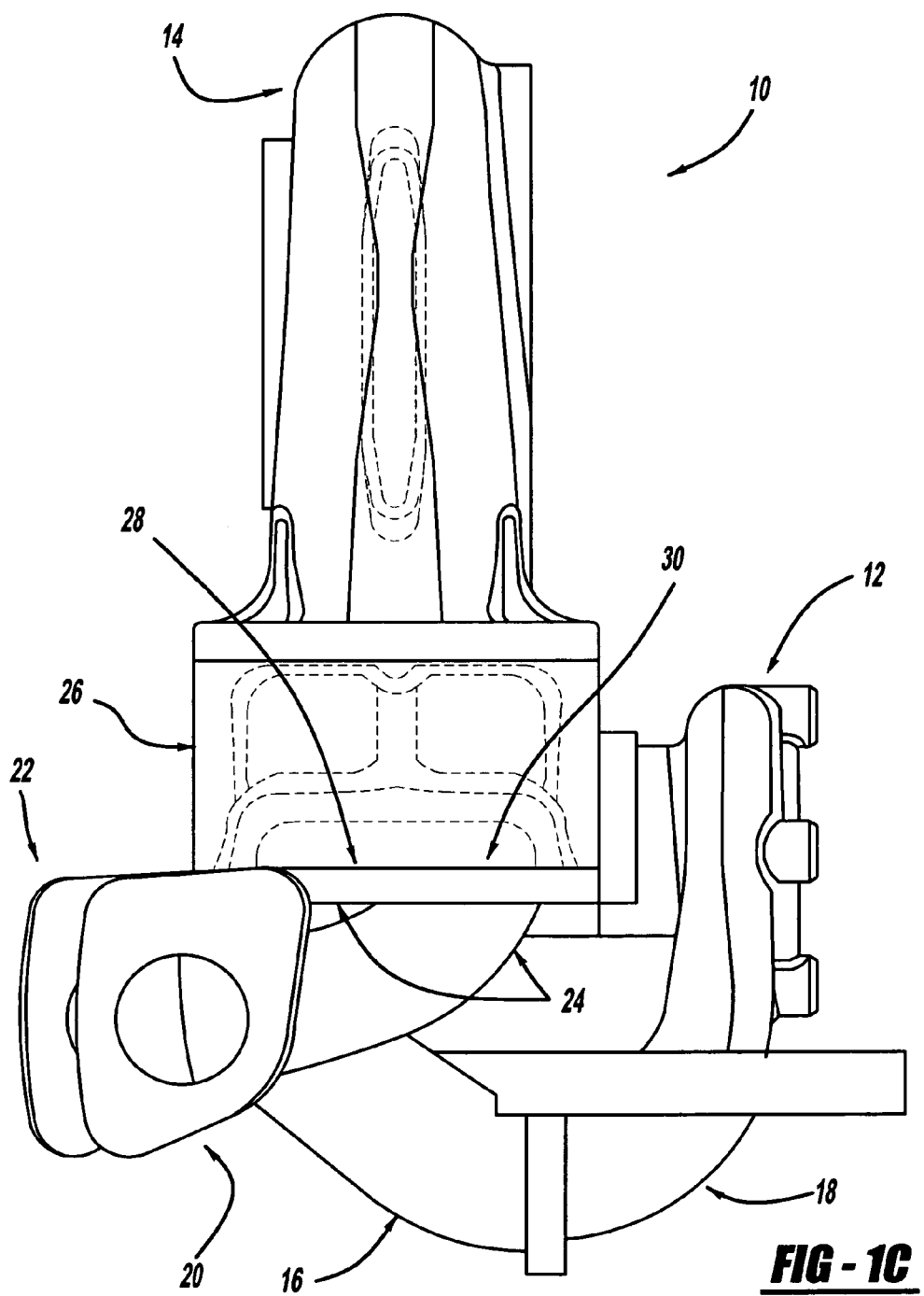
FIG. 1C is a front elevational view of the regulated two-stage turbocharger system depicted in FIG. 1A, in accordance with the general teachings of the present invention.
Figure 2:
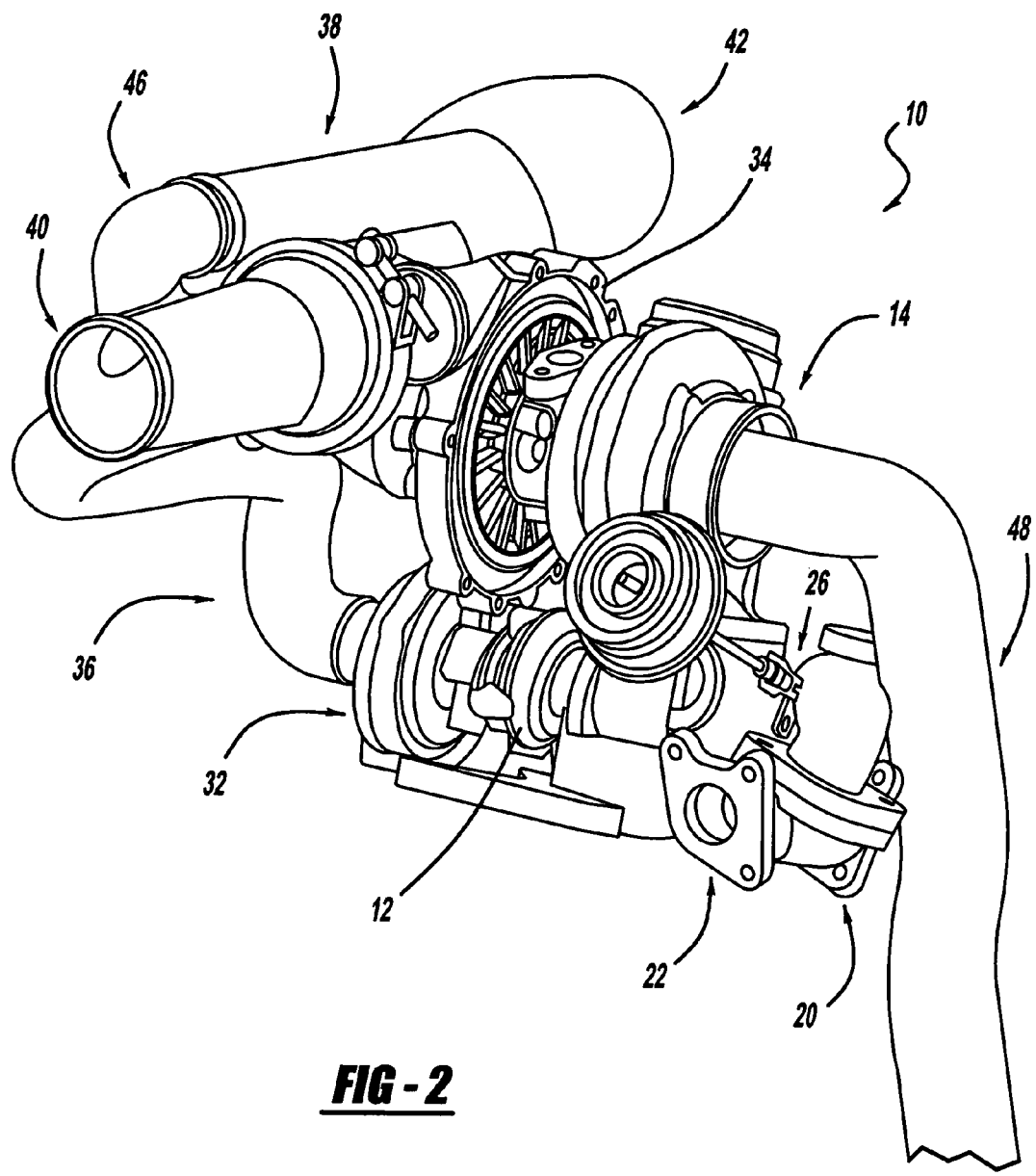
FIG. 2 is a front perspective view of an alternative regulated two-stage turbocharger system, in accordance with a first embodiment of the present invention.
Figure 3:
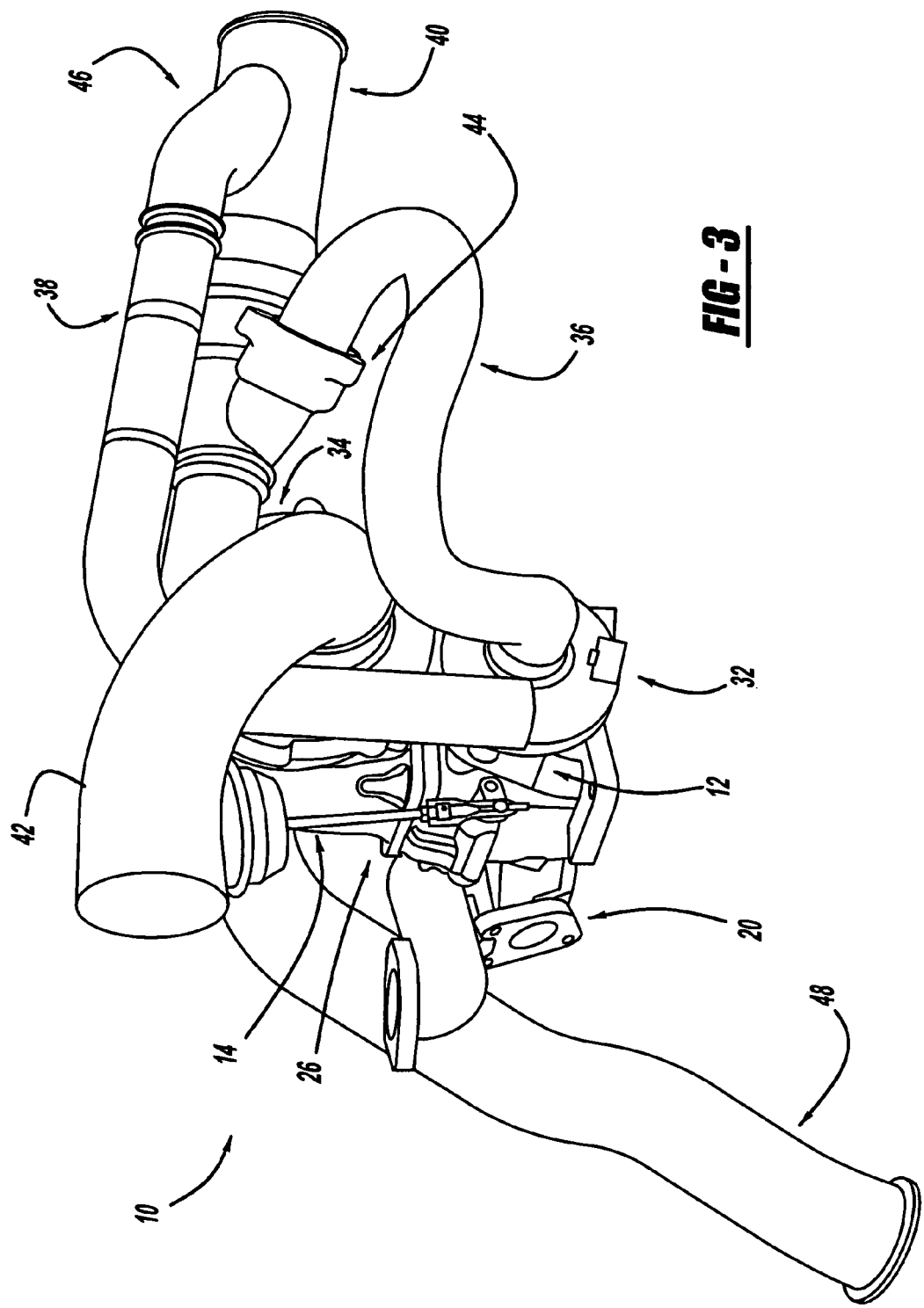
FIG. 3 is a rear perspective view of the alternative regulated two-stage turbocharger system depicted in FIG. 2, in accordance with a first embodiment of the present invention.

Referring to the Figures generally, and specifically to FIGS. 1-3, a regulated two-stage turbocharger assembly is shown generally at 10. The assembly 10 includes two exhaust gas turbine systems 12, 14, respectively. The associated compressor systems are not shown for purposes of clarity.

The first turbine system 12 is a high-pressure turbine, connected in series with the low-pressure turbine system 14. The assembly 10 also includes intake pipe 16, which is connected to a high-pressure turbine pipe 18. A first intake port 20 operates in conjunction with a second intake port 22 to feed exhaust gases from the vehicle's engine (not shown) into either the intake pipe 16, or the port intake pipes 24 of the assembly 10.

During normal turbocharging operation, at low engine speed, the exhaust gases from the engine do not generate enough energy to operate one large, low-pressure turbine, similar to the low-pressure turbine 14, but those same exhaust gases do provide enough energy to operate a smaller turbine, such as the high-pressure turbine 12. In a first mode of operation, the exhaust gases sequentially flow into the first intake port 20, the second intake port 22, the intake pipe 16, the high-pressure turbine pipe 18, and then finally into the high-pressure turbine 12. The high-pressure turbine then spins its associated compressor (element 32 as shown in FIG. 2) thus providing pressurized air to be forced back into the intake manifold so as to increase engine power and torque. As the engine speed increases, so does exhaust gas pressure and energy.

In accordance with one aspect of the present invention, the exhaust flow from the high-pressure turbine 12 enters the low-pressure turbine 14 in series. This is important even when there is not enough energy to drive the low-pressure turbine 14. As the speed and load build, the low-pressure turbine 14, in series with the high-pressure turbine 12, both provide intake pressure increase.

In accordance with one aspect of the present invention, the first port 20 and the second port 22 are in communication with one another through intake pipe 16, which allows for asymmetric valves to operate with independent control in transition from a first mode (e.g., light load) to fully open in a second mode (e.g., heavy load). Accordingly, it is noteworthy that the pressure is balanced between the left and right side exhaust manifolds. Without communication between ports 20, 22, respectively, the engine will not be pressure balanced.

In a second mode of operation, the exhaust gas from the engine passes through the port intake pipes 24 and flows directly into the low-pressure turbine 14, bypassing the high-pressure turbine 12, and spinning its associated compressor (element 34 as shown in FIG. 2), providing compressed air to the intake manifold of the engine at high engine speeds. The high-pressure turbine 12 loses its effectiveness at higher engine speeds, and the larger, low-pressure turbine 14 is used to effectively increase engine power at the higher engine speed range.

The present invention overcomes the problem of poor transition characteristics from the high-pressure turbine to the low-pressure turbine, typically found in conventional regulated two-stage turbocharger systems, and allows for a smooth transition from the high-pressure turbine 12, which affects performance mainly at low engine speeds, to the low-pressure turbine 14, which affects performance mainly at high engine speeds. The present invention employs a valve system 26 that is operable to selectively control the flow of exhaust gas to both the high- and low-pressure turbines 12, 14, respectively.

In accordance with one aspect of the present invention, the valve system 26 is operable to control, either independently or sequentially, at least one valve member, and, in accordance with another aspect of the present invention, at least two valve members so as to control gas flow (e.g., exhaust gas) therethrough. In accordance with still another aspect of the present invention, the valve members of the valve system 26 are asymmetric with respect to one another, such as but not limited to having differing diameters (e.g., port diameters). In accordance with yet another aspect of the present invention, the valve members of the valve system 26 have differing areas (e.g., perimeters, diameters, and/or the like) with respect to one another.

As previously noted, as the engine speed increases, so does exhaust mass flow and pressure. When the exhaust pressure reaches a certain predetermined value, a relatively small valve member 28 (e.g., disposed within or in operable association with the valve system 26) opens to begin to allow exhaust gas to bypass the high-pressure turbine 12 and flow directly into the low-pressure turbine 14. As the exhaust pressure continues to increase, a relatively large valve member 30 (e.g., also disposed within or in operable association with the valve system 26) begins to open, allowing even more high pressure exhaust gas to flow into the low-pressure turbine 14. The opening and closing of the small valve member 28 and the large valve member 30 can be controlled in such a way as to provide a smooth transition from using the high-pressure turbine 12 to the low-pressure turbine 14 and thus eliminate or at least lessen the momentary reduction of torque at the transition between the high pressure turbine and the low pressure turbine operation.

By way of a non-limiting example, the valve members, 28, 30, respectively, can be configured in any number of shapes, including but not limited to circles, ovals, squares, rectangles, and/or the like.

By way of a non-limiting example, the valves members 28, 30, respectively, can be controlled in any number of ways, including mechanically (e.g., springs or other biasable members, lost motion devices, and/or the like), pneumatically, electronically (e.g., through pulse width modulated (PWM) solenoids), or a combination of mechanical, pneumatic, and/or electronic methods. Additionally, additional control mechanisms, such as but not limited to the vehicle's ECU, e.g., in conjunction with appropriate monitoring devices, can monitor and/or control the function of the valve system 26.

In accordance with a first alternative embodiment of the present invention, the intended operation of the flow for both the intake and exhaust gases will now be described with specific reference to FIGS. 2 and 3.

The exhaust gas flows into the first intake port 20 and the second intake port 22. When the valve members 28 and 30 are closed, the gas then flows through high-pressure turbine 12, and into the low-pressure turbine 14. The high-pressure turbine 12 is operably connected to a compressor 32. As the high-pressure turbine 12 increases speed, the compressor 32 also increases speed, and fresh air coming in from a tube portion 36 is compressed and forced out into another tube portion 38. The pressurized air is then transferred into still another tube portion 40, and eventually into the intake manifold of the engine.

When both the small and large valve members 28, 30, respectively, are fully opened, the exhaust gas flows directly into the low-pressure turbine 14. The low-pressure turbine 14 is operably connected with a compressor 34, and increases in rotational speed as the low-pressure turbine 14 increases in speed. The compressor 34 receives air from a large intake pipe 42, compresses it, and then the high-pressure gas flows out of the tube portion 40. The tube portion 40 preferably includes a first connector tube 44 for feeding air through the tube portion 36 and into the compressor 32, and a second connector tube 46 for transferring air after it has been pressurized from the tube portion 38 to the tube portion 40. A tube portion 48 allows the exhaust gas passing through the low-pressure turbine 14 to be fed into the exhaust system of the vehicle.

Figure 4:
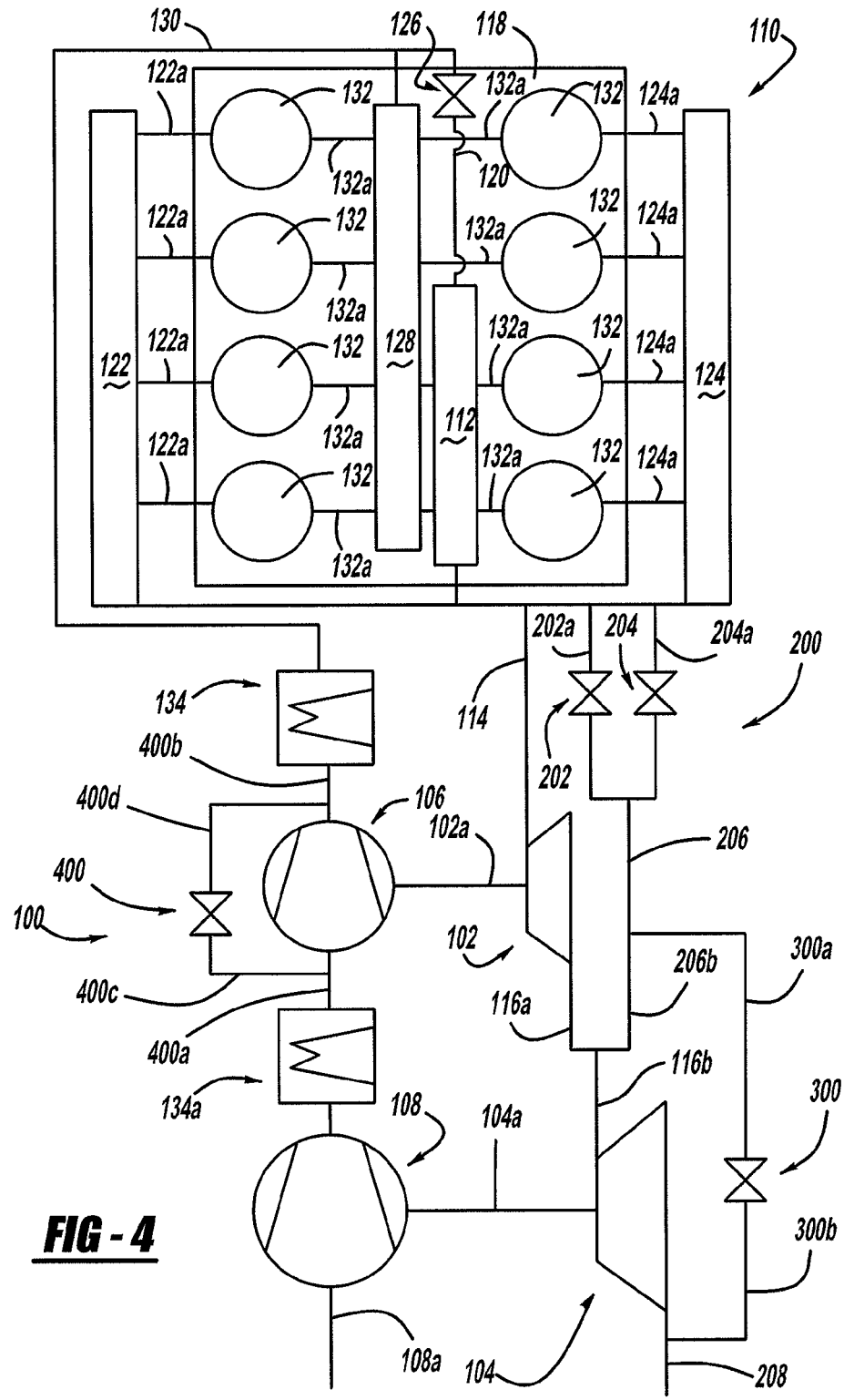
FIG. 4 is a schematic view of a second alternative regulated two-stage turbocharger system, in accordance with a second embodiment of the present invention.

Referring to FIG. 4, there is shown a schematic view of a second alternative regulated two-stage turbocharger system, in accordance with a second embodiment of the present invention.

A regulated two-stage turbocharger system is generally shown at 100. The turbocharger system 100 includes two exhaust gas turbine systems 102, 104, respectively. The associated compressor systems 106, 108, respectively, are operably associated with turbine systems 102, 104, respectively, e.g., via shaft members 102a, 104a, respectively.

The first turbine system 102 is a high-pressure turbine, operably associated with, in fluid communication with, and/or connected in series with the low-pressure turbine system 104. High-pressure turbine system 102 is in fluid communication with an engine system 110, e.g., via an exhaust manifold system 112, e.g., via conduit 114. High-pressure turbine system 102 is in fluid communication with low-pressure turbine system 104, e.g., via conduit 116.

Exhaust manifold system 112 is operably associated and/or in fluid communication with an engine 118, e.g., via conduit 120. In this manner, exhaust gas emanating from the operation of the engine 118, e.g., via exhaust banks 122, 124, respectively, is directed, e.g., via conduits 122a, 124a, respectively, through an optional EGR valve 126 to the exhaust manifold system 112, wherein it can be ultimately directed to the turbocharger system 100. Additionally, an intake manifold system 128 is operably associated and/or in fluid communication with engine 118; e.g., via conduit 130, so as to be able to introduce air into engine system 110, specifically cylinders 132, e.g., via conduits 132a. An optional intercooler system 134 is operably associated and/or in fluid communication with the intake manifold, e.g., via conduit 130. An optional second intercooler system 134a is operably associated and/or in fluid communication with either of the compressor systems 106, 108, respectively. Although a V-8 engine system is shown, it should be appreciated that the present invention can be practiced with any type of engine configuration, including but not limited to V-4, V-6, and/or inline engine configurations (e.g., I-4, I-5, I-6 and/or the like).

The present invention employs an optional valve system 200 that is operable to selectively control the flow of exhaust gas to the low-pressure turbine system 104, thus being operable to better match gas flow conditions/requirements and improve the overall response and performance of the turbocharger system 100.

In accordance with one aspect of the present invention, the valve system 200 is selectively operable to control, either independently or sequentially, at least two turbine regulating valve members 202, 204, respectively, so as to control gas flow (e.g., exhaust gas flow) therethrough, e.g., through low-pressure turbine system 104.

In accordance with one aspect of the present invention, the valve system 200 is operable to control, either independently or sequentially, at least one valve member, and, in accordance with another aspect of the present invention, at least two valve members so as to control gas flow (e.g., exhaust gas) therethrough. In accordance with still another aspect of the present invention, the valve members of the valve system 200 are asymmetric with respect to one another, such as but not limited to having differing diameters (e.g., port diameters). In accordance with yet another aspect of the present invention, the valve members of the valve system 200 have differing areas (e.g., perimeters, diameters, and/or the like) with respect to one another.

The turbine regulating valve members 202, 204, respectively, are in fluid communication with the exhaust manifold system 112, e.g., via co nduits 202a, 204a, respectively. The turbine regulating valve members 202, 204, respectively, are also in fluid communication with the low-pressure turbocharger 104 turbine portion e.g., via conduits 206a, 206b, and 116b, A conduit 208 allows exhaust gas to pass out of the low-pressure turbine portion 104, e.g., to a taste gate or to an exhaust system (not shown). An optional waste gate or turbine by- pass system (e.g., a valve member) 300 is in fluid communication with conduits 300aand 300b, the intended purpose of which will be described herein.

By way of a non-limiting example, the turbine regulating valves members 202, 204, respectively, can be controlled in any number of ways, including mechanically (e.g., springs or other biasable members, lost motion devices, and/or the like), pneumatically, electronically (e.g., through pulse width modulated (PWM) solenoids), or a combination of mechanical, pneumatic, and/or electronic methods. Additionally, additional control mechanisms, such as but not limited to the vehicle's ECU, e.g., in conjunction with appropriate monitoring devices, can monitor and/or control the function of the valve system 200, and more specifically, the turbine regulating valve members 202, 204, respectively.

By way of a non-limiting example, the optional waste gate or turbine by-pass valve member 300 can be controlled in any number of ways, including mechanically (e.g., springs or other biasable members, lost motion devices, and/or the like), pneumatically, electronically (e.g., through pulse width modulated (PWM) solenoids), or a combination of mechanical, pneumatic, and/or electronic methods. Additionally, additional control mechanisms, such as but not limited to the vehicle's ECU, e.g., in conjunction with appropriate monitoring devices, can monitor and/or control the function of the waste gate or turbine by-pass valve member 300.

An optional compressor by-pass system (e.g., a valve member) 400 is in fluid communication with the high-pressure compressor portion 106, the intended purpose of which will be described herein. In accordance with one aspect of the present invention, the compressor by-pass system 400 is passively-controlled. The compressor by-pass valve member 400 is also in fluid communication with conduit 400a (which exits from low-pressure compressor portion 108) and conduit 400b (which enters the optional intercooler system 44), e.g., via conduits 400c and 400d. The intended purpose of the compressor by-pass valve member 400 will be described herein. Fresh air is introduced into low-pressure compressor system 108, and components downstream thereof, via conduit 108a.

Where low engine speed and load conditions are present, the engine speed and load are relatively low, the resulting exhaust mass flow and pressure are also relatively low. In this case, the engine 118 is running and producing an exhaust gas flow, which is eventually directed through the exhaust manifold system 112. The turbine regulating valves 202, 204, respectively, the optional waste gate or turbine by-pass valve member 300, and the optional compressor by-pass valve member 400 are all closed, i.e., an exhaust gas flow cannot proceed therethrough. As previously noted, the active control of one or more of these various valve members can be achieved through the use of the vehicle's ECU, as well as various sensors in communication therewith.

As such, the exhaust gas flow has to flow through the high-pressure turbine system 102. As the high-pressure turbine system 102 is in fluid communication with the low-pressure turbine system 104, e.g., via conduits 116aand 116b, at least a portion of the exhaust gas flow is introduced into the low-pressure turbine system 104.

As the high-pressure turbine system 102 increases speed, the associated high-pressure compressor system 106 also increases speed. The low-pressure turbine system 104 also increases speed to a certain extent, albeit to a lesser extent than the high-pressure turbine system 102, and the associated low-pressure compressor system 108 also increases speed to a certain extent, albeit to a lesser extent than the high-pressure compressor system 106. In this manner, fresh air, e.g., coming in from conduit 108a, is compressed, e.g., via low-pressure compressor system 108 and high-pressure compressor system 106, and eventually introduced into the intake manifold 128 of the engine 118.

Where transitional engine speed and load conditions are present, the engine speed and load are increasing, the resulting exhaust mass flow and pressure are also increasing. In this case, the engine 118 is still running and producing an increasing exhaust gas flow, which again is eventually directed through the exhaust manifold system 112. The turbine regulating valve 204, the waste gate or turbine by-pass valve member 300, and the compressor by-pass valve member 400 are all closed, i.e., an exhaust gas flow cannot proceed therethrough. As previously noted, the active control of one or more of these various valve members can be achieved through the use of the vehicle's ECU, as well as various sensors in communication therewith. However, turbine regulating valve 202 is open, i.e., an exhaust gas flow can proceed therethrough.

As such, atleast a portion of the exhaust gas flow has to flow through the high-pressure turbine system 102. As the turbine regulating valve 202 is in fluid communication with the low-pressure turbine system 104, e.g., via conduits 206a, 206band 116b, at least a portion of the exhaust gas flow is introduced into the low-pressure turbine system 104.

As the high-pressure turbine system 102 increases speed, the associated high-pressure compressor system 106 also increases speed. The low-pressure turbine system 104 also increases speed to that of around the high-pressure turbine system 102, and the associated low-pressure compressor system 108 also increases speed to an extent of about the high-pressure compressor system 106. In this manner, fresh air, e.g., coming in from conduit 108a, is compressed, e.g., via low-pressure compressor system 108 and high-pressure compressor system 106, and eventually introduced into the intake manifold 128 of the engine 118.

Where rated engine speed and load conditions are present, the engine speed and load have reached their maximum levels, the resulting exhaust mass flow and pressure have also reached their maximum levels. In this case, the engine 118 is again still running and producing a maximum exhaust gas flow, which again is eventually directed through the exhaust manifold system 112. The turbine regulating valves 202, 204, respectively, optionally, the waste gate or turbine by-pass valve member 300, and, optionally, the compressor by-pass valve member 400 are all open, i.e., an exhaust gas flow can proceed therethrough. As previously noted, the active control of one or more of these various valve members can be achieved through the use of the vehicle's ECU, as well as various sensors in communication therewith.

As such, the exhaust gas flow, or at least a major portion thereof, does not flow through the high-pressure turbine system 102, i.e., the high-pressure turbine system 102 is essentially by-passed. As the exhaust manifold system 112 is in fluid communication with the turbine, by-pass valve system 200, e.g., via conduits 202a, 204a, respectively, all, or at least a major portion of the exhaust gas flow is introduced into the low-pressure turbine system 104 via conduits 206a, 206b and 116b. Because waste gate or turbine by-pass valve member 300 is also open, at least a portion of the exhaust gas flow can by-pass the low-pressure turbine system 104 (via conduits 206a, 300a and 300b), e.g., if the exhaust gas flow pressure exceeds a predetermined level that could potentially damage the low-pressure turbine system 104, or any other components of the turbocharger system 100 and/or engine system 110.

As the low-pressure turbine system 104 is at maximum speed, the associated high-pressure compressor system 108 also reaches maximum speed. In this manner, fresh air, e.g., coming in from conduit 108a, is compressed, e.g., via low-pressure compressor system 108, and eventually introduced into the intake manifold 128 of the engine 118. Although the high-pressure turbine system 102 is essentially by-passed, a minimal amount of exhaust gas flow may pass therethrough, which can cause the associated high-pressure compressor system 106 to be actuated to a certain extent. Even if this occurs, the compressor by-pass valve member 400 is open, so that the high-pressure compressor system 106 is by-passed or essentially by-passed. The intended purpose of the compressor by-pass valve member 400 is to prevent damage to the high-pressure compressor system 106 when the high velocity air flow coming from the low-pressure compressor system 108 exits therefrom, e.g., via conduit 400a. Additionally, the compressor by-pass valve member 400 also improves overall system efficiency. Thus, the high velocity air flow can instead travel through conduits 400c, 400d, respectively, into conduit 400b and eventually into the intake manifold 122.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A turbocharger system (100), comprising:
    a high-pressure turbocharger unit (102) having a high-pressure turbine connected via a conduit (114) with an exhaust manifold (112);
    a low-pressure turbocharger unit (104) having a low-pressure turbine,
        wherein the low-pressure turbocharger unit (104) is operably associated with the high-pressure turbocharger unit (102);
        wherein the low-pressure turbine of the low-pressure turbocharger unit (104) is connected in series via conduits (116a, 116b) with the high-pressure turbine of the high-pressure turbocharger unit (102), and
        wherein the low-pressure turbine has a discharge conduit (208) being in fluid communication to a waste gate;
    a valve system (200, 300), including a first asymmetric valve (202), a second asymmetric valve (204), and a turbine bypass valve (300), to selectively meter a gas flow to the high-pressure turbine of the high-pressure turbocharger unit (104) such that in at least one mode of operation, the high-pressure turbine of the high-pressure turbocharger unit (102) is bypassed by the first asymmetric valve (202) and the second asymmetric valve (204),
        wherein the first asymmetric valve (202) is connected to an exhaust manifold (112) by a first conduit (202a) and the second asymmetric valve (204) is connected to the exhaust manifold (112) by a second conduit (204a),
        wherein the first asymmetric valve (202) and the second asymmetric valve (204) are in fluid communication with the low-pressure turbine of the low-pressure turbocharger unit (104) by conduits (206a, 206b and 116b) and wherein the conduits (116a, 116b) have a common connection with an end of the conduit (206b),
        wherein the first asymmetric valve (202) and the second asymmetric valve (204) are in fluid communication with the discharge conduit (208) to bypass the high pressure turbine of the high-pressure turbocharger unit (102) and the low-pressure turbine of the low-pressure turbocharger unit (104) by fluid communication with the conduit (206a) receiving exhaust gas from the first asymmetric valve (202) and the second asymmetric valve (204) and then passing the exhaust gas into low-pressure turbocharger by turbine bypass conduits (300a, 300b), and wherein the conduits (206a, 300a) have a common connection branching off of another end of the conduit (206b);
        wherein the conduit (206a) receiving the exhaust gas from the first asymmetric valve (202) and the second asymmetric valve (204) and then passing the exhaust gas through turbine bypass conduits (300a, 300b), and wherein the turbine bypass valve (300) connects said turbine bypass conduit (300a) with said turbine bypass conduit (300b); and
    a control unit,
    wherein:
        at low engine speed and load conditions, the control unit closes the first asymmetric valve (202) and the second asymmetric (204), and the turbine bypass valve (300) to allow the exhaust gas to flow through the high-pressure turbine of the high-pressure turbocharger (102) with fluid communication of the high-pressure turbine of the high-pressure turbocharger (102) with the low-pressure turbine of the low-pressure turbocharger (104),
        at an increase in engine speed and load, the control unit opens the first asymmetric valve (202) to allow the exhaust gas to flow to the low-pressure turbine of the low-pressure turbocharger unit (104) via the conduits (206*a*, 206*b*, 116*b*), and at being reached maximum engine speed and load conditions, the control unit additionally opens the second asymmetric (204) and the turbine bypass valve (300) to allow the exhaust gas to proceed there through to essentially bypass the high-pressure turbocharger (102) and the low-pressure turbocharger (104) via the conduit (206*a*) receiving the exhaust gas from the first asymmetric valve (202) and the second asymmetric (204) and passing the exhaust gas into said bypass turbine conduits (300*a*, 300*b*) and said discharge conduit (208).

\* \* \* \* \*

UNITED STATES PATENT AND TRADEMARK OFFICE
CERTIFICATE OF CORRECTION

PATENT NO. : 8,490,395 B2  
APPLICATION NO. : 12/928849  
DATED : July 23, 2013  
INVENTOR(S) : Grisson et al.

Page 1 of 1

It is certified that error appears in the above-identified patent and that said Letters Patent is hereby corrected as shown below:

In the Drawings

Figure 4 Reference number "206" should be -- 206a --.

In the Specification

Column 7,  
Line 31, "co duits" should be -- conduits --.

Column 7,  
Line 36, "taste" should be -- waste --.

In the Claims

Claim 1, Column 10,  
Line 59, insert -- valve -- before -- (204) --.

Claim 1, Column 11,  
Line 6, insert -- valve -- before -- (204) --.

Signed and Sealed this  
First Day of July, 2014

Michelle K. Lee  
*Deputy Director of the United States Patent and Trademark Office*

UNITED STATES PATENT AND TRADEMARK OFFICE
CERTIFICATE OF CORRECTION

| | | |
|---|---|---|
| PATENT NO. | : 8,490,395 B2 | Page 1 of 1 |
| APPLICATION NO. | : 12/928849 | |
| DATED | : July 23, 2013 | |
| INVENTOR(S) | : Thomas A. Grissom et al. | |

It is certified that error appears in the above-identified patent and that said Letters Patent is hereby corrected as shown below:

Title page,
Item [54] and in the specification, column 1, line 1, Title, insert --FLOW-- between "TURBINE" and "REGULATING".

Signed and Sealed this
Twenty-fourth Day of November, 2015

Michelle K. Lee
*Director of the United States Patent and Trademark Office*